Nov. 14, 1950     A. L. ERICKSON     2,529,800
FEEDER GAUGING MEANS FOR FISH DRESSING MACHINES
Filed Oct. 21, 1940     2 Sheets-Sheet 1

Inventor
Alvin L. Erickson
By Reynolds & Beach
Attorneys

Nov. 14, 1950        A. L. ERICKSON        2,529,800
FEEDER GAUGING MEANS FOR FISH DRESSING MACHINES
Filed Oct. 21, 1940        2 Sheets-Sheet 2
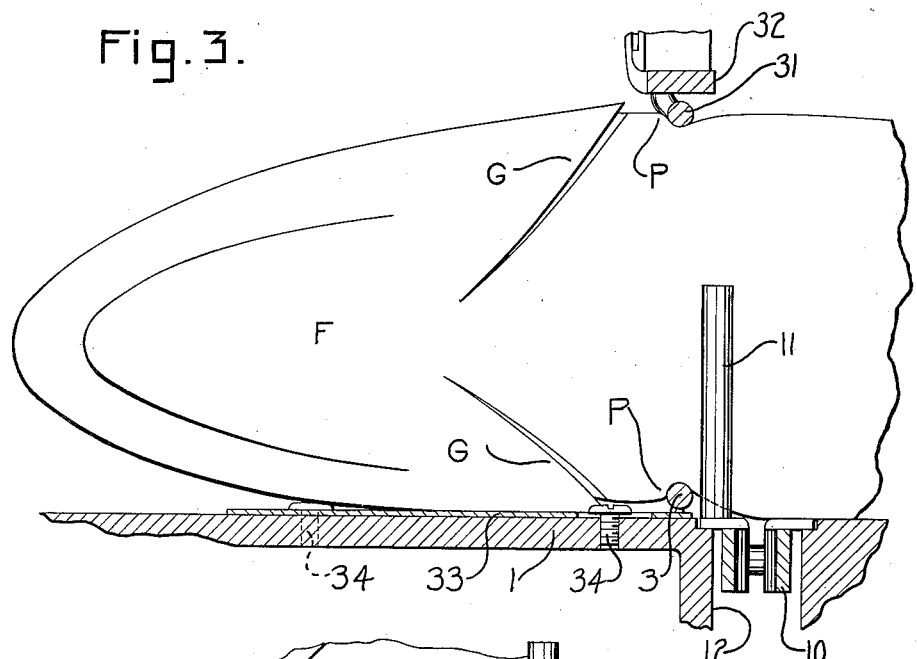
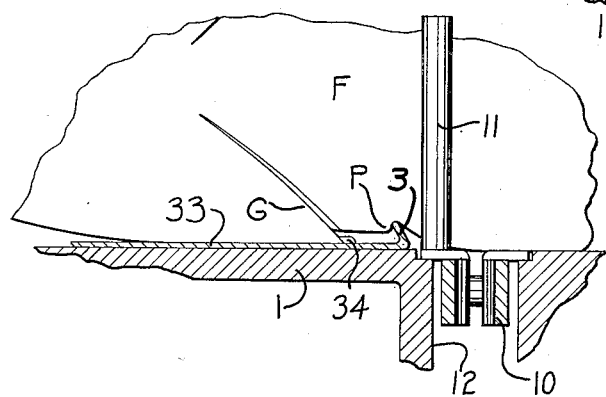
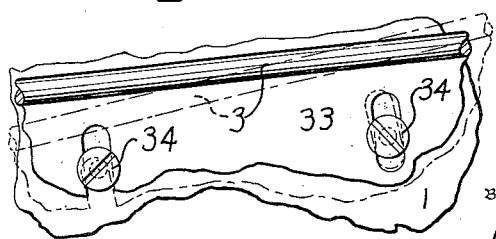
Inventor
By Alvin L. Erickson
Reynolds & Beach
Attorneys Patented Nov. 14, 1950

2,529,800

UNITED STATES PATENT OFFICE 2,529,800

FEEDER GAUGING MEANS FOR FISH DRESSING MACHINES

Alvin L. Erickson, Seattle, Wash., assignor to Smith Cannery Machines Company, Seattle, Wash., a corporation of Washington Application October 21, 1940, Serial No. 362,080

30 Claims. (Cl. 17—2)

Fish dressing machines which include a beheading knife are available, designed primarily for cleaning and dressing salmon for commercial canning, which machines are capable of sustained operation at a high rate of speed, perhaps eighty to ninety fish a minute. In order that the operator's hand may never come within range of the beheading knife, fish are fed to such a fish dressing machine by a feeder table, and the beheading knife is located at the remote end of such table from the feed point. Either such knives rotate relative to the table, or rotating arms carry the fish past stationary knives. In either case, and particularly when the knives are rotating, because of their weight and the speed of operation, there is a very real danger of injury to the operators, if the operators are required or permitted to handle fish in the near vicinity of the beheading point, for the beheading rate must, of course, correspond to the rate of operation of the fish-dressing machine itself. The fish are, therefore, manually placed by the operators upon the feeder table at a reasonably remote point, and thereby is introduced the difficulty of securing exact registry between the fish and the distant beheading knife.

Exact registry is highly desirable, however, for it is desirable that all the usable flesh, particularly at the large part of the fish immediately behind the head, be saved and utilized to the fullest extent possible. On the other hand, it is undesirable to retain any appreciable amount of the hard or bony structure of the gills or of the pectoral girdle or "collar bone" which lies immediately to the rear of the gills. Therefore it is essential that the fish be precisely located with respect to the beheading point in the direction of its length, so that on the one hand not too much of the body be cut off with the head, nor, on the other hand, that any appreciable amount of the hard bony structure be left attached to the body. At the rate of speed at which these machines operate, and particularly under the conditions where such machines are operated, where the light is often poor, it is scarcely possible to align the fish accurately with the distant beheading point by sight. Particularly is this true when, from its very nature, the work becomes monotonous and the attention of the operator is relaxed or distracted, or the operators become fatigued. Various sight gauges have been provided heretofore for the purpose of indicating upon the fish, in advance of the beheading point, its proper alignment with respect to the beheading point, but all of these rely on the continued attention and vision of an unskilled and usually inattentive operator, and therefore have proved inadequate solutions to the problem.

It has also been proposed to employ traveling pins which enter the gill, and thereby serve as register pins to locate the fish properly with respect to its length. This might be reasonably satisfactory at a lower feed rate, but is scarcely feasible at present-day high speeds. Moreover, and at any speed, it requires some physical and mental effort on the part of the operator to secure the fish properly upon such pins, and even if this could be and was accomplished, it would still fail of its intended purpose because of the fact that the fish are random sizes, some running as low as three or four pounds, and others up to twenty pounds or more, and the head size and the spacing rearwardly thereof of the rear end of the pectoral girdle naturally varies with the size of the fish. Therefore in the small fish too much flesh is cut away with the head, and in large fish too much of the bony structure is left with the body. Also, such register pins increase the difficulties of severing the head neatly and cleanly from the body at the beheading point, and of starting the head on its way to a disposal point.

I have discovered how such fish, in random sizes, may be accurately located semi-automatically, with a minimum of effort and attention by the operator, so that the fish, if too far withdrawn towards their tail ends, will be shifted, as they advance, into exactly the correct registry with a registry point such as the beheading point, thereby insuring to the highest degree possible that the beheading cut will come in exactly the right place, lengthwise of the fish, and in turn promoting economy by the most economical employment and usage of the flesh of the fish, and by avoiding the degrading of the pack by the inclusion of an undue amount of bony structure in any can.

The accompanying drawings disclose the principles of my invention as applied by way of example to a known feeder table of the general type disclosed in the patent to Norford L. Oates, No. 2,346,935, issued April 18, 1944, to which reference may be made for a fuller disclosure of the details of construction of the feeder table and its relationship to the fish dressing machine. There was in that application a means engageable with the fish whereby an operator, by fuel, could locate each fish accurately, but that did not always work satisfactorily because the operators would not even take care to push the fish against the gauge rail. By this invention even an approximately located fish is engaged and is caused to be shifted, as it advances, until it is left in precise registry with the beheading point, prior to the fish's reaching such point.

The disclosure in the accompanying drawings and in this specification represents a typical practical form, but it will be understood that any form which is within the scope of the appended claims shall be understood as within the present invention.

Figure 3 is in general a section through the feeder table, showing in detail the manner of cooperation of the parts of my invention, and their relationship to the fish and to the fish-advancing means.

Figure 4 is a view similar to Figure 3, showing a different shape of rail.

Figure 5 is a fragmentary plan view, showing the provision for adjustment of the rail.

Figure 1:
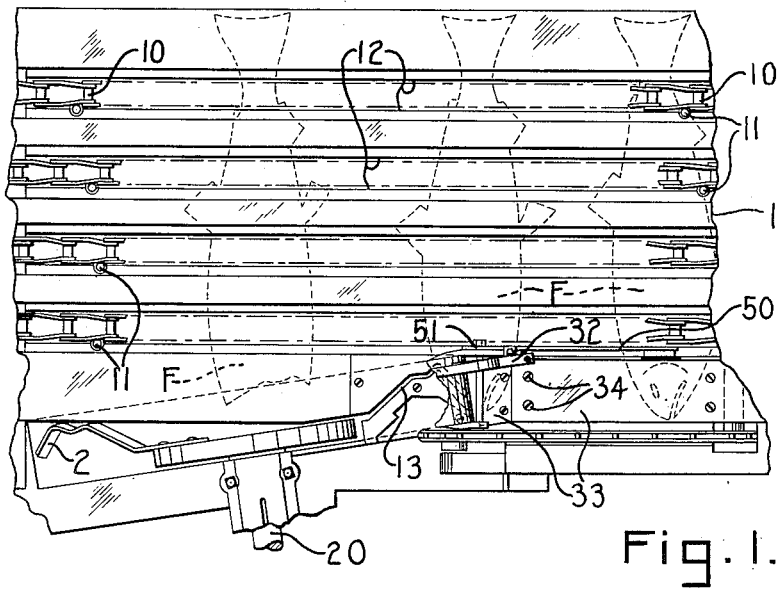
Figure 1 is a plan view of portions of a feeder table, showing my invention incorporated therein.
Figure 2:
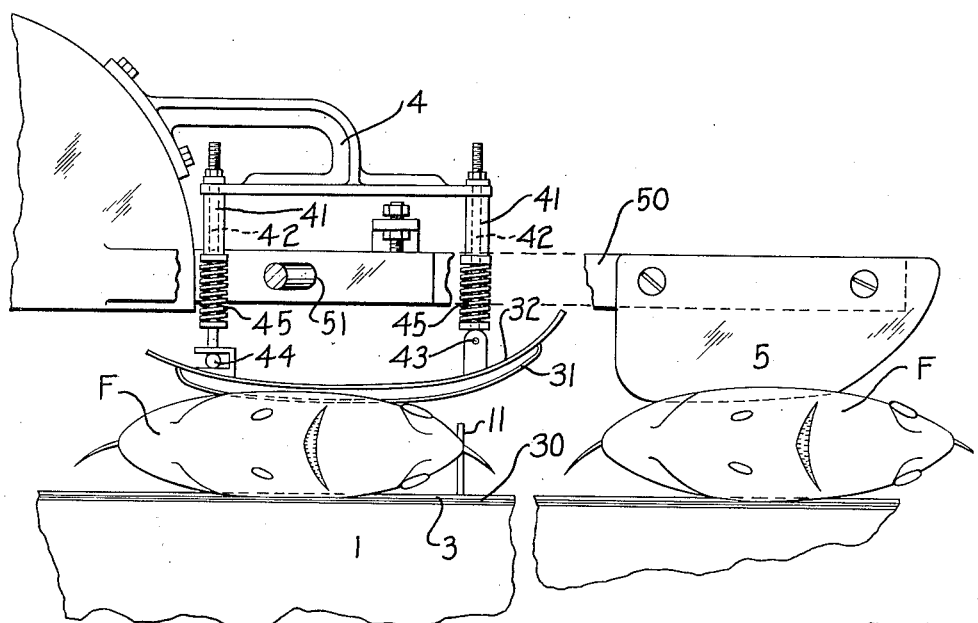
Figure 2 is a side elevation of the feeder table, showing my invention in its relation to a fish which is being advanced along the feeder table.

The difficulty heretofore has always been to obtain precise registry between the beheading knife, at the fixedly positioned beheading point, which may be termed the registry point, and the commencement of the fleshy part of the advancing fish immediately to the rear of the gill structure and of the pectoral girdle, which defines the rear part of the gill structure. It has been discovered that the pectoral girdle, which is curved as it might be viewed in side elevation, and which lies immediately beneath the skin to the rear of the gill, in itself affords a convenient and accurate gauge point, which may be engaged by depressing the flesh immediately to the rear of the pectoral girdle, so that the pectoral girdle itself may be engaged from the rear, and in cooperation with a guide running generally in the direction of advance of the fish, will serve to position the fish, or if necessary, to effect shifting of the fish in the direction of its snout, thereby, when the fish advances beyond the engaging element in the course of its advance, leaving the fish disposed in precisely the proper relationship to the registry point, with relationship to which the fish engaging means is in turn precisely located.

In such feeder tables, indicated in general at 1, each fish F is laid, with its head toward the one end, in a direction to advance flatwise, and normally with its back first. Its position transversely of the table and of the direction of advance is determined, and its advance is caused, by upstanding pins 11 carried on spaced chains 10, running in grooves 12 of the table. The beheading point is shown as a slot 13 shaped for the passage of a knife 2 carried upon a rotating shaft 20. The precise shape of the knife is of no importance, so far as the present invention is concerned, nor is the position of the knife with respect to the table. Indeed, insofar as the present invention is concerned, the knife might well be a stationary knife of known type, past which the fish is moved, for there is still the problem of accurate registry in the latter arrangement. More broadly, it is not essential that the registry be with relation to a beheading point, as it may be desirable to effect registry of the fish in the direction of its length with some other operating device. The essence of the present invention lies in securing accurate registry of the fish, by shifting if necessary as the fish advances, with a registry point by gauging directly from the rear of the pectoral girdle, the gauge being precisely located, lengthwise of the fish, relative to the registry point.

This end is accomplished by providing at least one, preferably two, elements in the nature of rails, which for the most part extend generally parallel to the direction of advance of the fish, in position to engage and depress the flesh immediately to the rear of the pectoral girdle. If two such rails are used, one is located at each side of the fish, that is, one above and one below, and these rails, by their engagement with the pectoral girdle, serve as stops (as in Patent No. 2,346,935) to determine the fish's location in the direction of its own length. These rails may be slightly inclined, or preferably have an inclined terminal section or sections, which sections, by their inclination with respect to the direction of advance, will shift the fish bodily in the direction of its own length, and towards its head end, if it is withdrawn too far towards its tail end, so that when the fish passes from the terminus of such rail or rails, it will be precisely located with respect to the beheading point or other registry point.

Such a rail is shown at 3, upstanding slightly from the surface of the feeder table 1, and directed generally towards the beheading point at 13. The action of such rails is best illustrated in Figure 3. The flesh is depressed immediately to the rear of the pectoral girdle, indicated at P, and behind the gills G, so that the rail 3 may have guiding engagement with the rear of the pectoral girdle.

The precise size of the rail, and its roundness or abruptness, depends upon variable factors, principally the degree of firmness or softness of the fish's flesh, but also upon such factors as the stiffness and size of the scales, and the total weight of the fish, hence it can not be said that one size or shape is preferable. It can be stated, however, that such a rail should not be so abrupt that it will dig into and groove the flesh, nor engage the scales, to an extent to prevent the fish from sliding lengthwise nor transversely, nor from twisting, relative to the rail. At the same time, the rail must sufficiently depress the flesh that there is no likelihood of the pectoral girdle sliding past the rail, in a direction towards the tail end; rather, the engagement between the pectoral girdle and the rail must be sufficiently forceful that, if the rail is inclined relative to the fish's direction of movement, the fish will be bodily shifted lengthwise towards its head end. The rail, then, should be reasonably abrupt for firm, solid flesh, as seen in Figures 4 and 6, but for soft flesh should be rounded, perhaps $\frac{3}{16}$ inch in diameter, as seen in Figure 3.

Lengthwise shifting of the fish may be accomplished preferably by an inclined section 30 of the rail, which terminates adjacent the beheading point 13. This inclined section is provided so that the workman may drop the fish upon the table, and with reasonable accuracy, and by feel, may engage the pectoral girdle P on the under side of the fish with the portion of rail 3 aligned with the direction of advance of the fish, but if the pectoral girdle is not thus engaged with the rail to locate the fish exactly, it will be positioned accurately by the inclined portion 30, which, if required, will shift or draw the fish in the direction of its length and toward its head end, so that when the fish leaves the terminus of the inclined section 30 it will be in precise registry with the beheading point. With the straight rail shown each increment of the fish's advance towards the beheading point produces a uniform increment of its shifting snout-wise.

It may be pointed out that while the section 30 is described as inclined, this merely means that it is so formed as to effect, if required, a lengthwise shifting of the fish. The same effect may be accomplished by a suitably curved construction, and this meaning is to be understood as included within the term "inclined."

Preferably, as we have indicated above, two such guide means are employed in cooperation, one below the fish and one above. The upper rail 31 need not extend over a greater part of the length of the rail 3 than the inclined portion 30. The rail 31, supported by the shoe 32 to give it some added weight, and broad enough to insure that the rail 31 will not dig too deeply into the flesh, is spaced above the rail section 30, and is upturned at its oncoming end sufficiently to ride over and press down upon the fish, and to press the lower and upper rails into the fish's flesh. The two rail sections 30 and 31 are yieldingly urged together by suitable means, but are held fixedly in parallelism, as viewed in plan, so that as one engages the pectoral girdle on the lower side of the fish the other engages behind the pectoral girdle at the upper side of the fish.

Any suitable means for supporting the upper rail 31 may be employed. The means shown is merely suggestive. It comprises a bracket 4 carrying two vertical guides 41 in which vertical rods 42 are slidable, which stems are pivotally connected at 43 and 44, respectively, to the shoe 32. Springs 45 urge the respective rods 42 downwardly and may urge the rail 31 into the flesh of the fish. There is sufficient looseness or freedom of movement (the pin 44 being received, for instance, in a slot) that the shoe 32 may rock on either pivot point 43 or 44, or both may move vertically at the same time, thus to accommodate and ride over the fish, and to accommodate itself to the varying sizes or thickness of fish.

To permit interchange of more or less rounded or abrupt rails, especially in the inclined section 30, these sections are preferably carried by removable plates 33, secured to the table 1 by screws 34. By the use of slots or enlarged holes the transverse positioning, or the degree of inclination of these rails 30 may be varied, and the rail section 3 may similarly be adjustable. Corresponding adjustment of the cooperating upper rail 31 should be accomplished when the rail 30 is adjusted, so that they remain always one immediately above and coincident with the other, as viewed in plan. Indeed, if these two rails 30 and 31 are positively shiftable, each fish engaged between them may, at an appropriate instant, be shifted lengthwise into precisely the correct position, and left there.

It is contemplated that the operators will quickly become accustomed to locating the fish by crowding the pectoral girdle against the rail 3, and that any minor misalignment will be cured by enforced lengthwise shifting of the fish as it advances along the inclined sections 30 and 31. It may be desirable to provide a stop, located to engage behind the uppermost pectoral girdle while the fish is being placed or located upon the table, and which will cooperate with the rail 3 in initially locating the fish. To this end there may be employed a dull-edged blade 5, mounted upon an arm 50 pivotally supported at 51, which immediately overlies the rail 3 well in advance of the inclined sections 30 and 31. Preferably the stop blade 5 is wholly independent of the rail 31. It is shaped to ride over any fish advancing to and past it, but has sufficient weight to depress the flesh behind the uppermost pectoral girdle. It cooperates with the rail 3, which it immediately overlies, to permit the fish to be shoved in a direction towards its tail, as the fish is laid upon the table 1, and to be stopped by this engagement behind the pectoral girdles at top and at bottom.

It is believed that it will now be evident how the device obtains proper registry—by gauging on the pectoral girdle which is itself the line of separation between the wanted flesh and the unwanted bony structure.

What I claim as my invention is:

1. A feeder table for fish dressing machines comprising means to support and advance the fish flatwise and disposed crosswise of the direction of advance to and past a beheading point, a rail disposed generally parallel to the direction of advance, directed in general towards the beheading point, and projecting within the fish's path of advance to engage the rear edge of the pectoral girdle, the rail at a point in advance of the registry point, having a section which is inclined to shift the fish, if the latter is withdrawn too far towards its tail end, by engagement with the pectoral girdle in the direction of its length and toward its head end, said rail, including its inclined section, being so located, and terminating at such point, relative to the beheading point, that such engagement will guide the fish properly to the beheading point, and fixedly positioned means spaced from and parallel to the inclined section, to engage the rear edge of the opposite side of the pectoral girdle, and cooperating with the inclined rail section to shift the fish as it advances, bodily towards its head end, if necessary to effect proper registry.

2. The combination of claim 1, wherein the rail is located beneath the fish and projects upwardly to engage the rear edge of the underside pectoral girdle, and wherein the cooperating means is disposed to engage the rear edge of the upper side of the pectoral girdle, and means yieldingly supporting the cooperating means for vertical movement, to accommodate various sizes of fish.

3. In combination with means to support and advance individual fish, flatwise and in a direction transversely to their length, to a registry point such as a beheading point, with relation to which the pectoral girdle of the fish must be exactly located in the direction of their length, comprising two blunt-edged rails disposed one above the other, and yieldingly urged relatively toward each other, said rails each extending generally in the direction of advance, but both being inclined towards a terminus which bears a definite position relationship to the registry point from an initial point which is nearer to the tail end of the fish, said rails being formed and positioned in the fish's path to depress the flesh and to engage the rear edge of the pectoral girdle, at opposite sides of the fish, and by such engagement, as the fish advances, to shift the fish lengthwise if it is disposed too far towards its tail end, and to position the fish lengthwise, as it leaves the rails' termini, in the predetermined exact relationship to the registry point.

4. In combination with means to support and advance individual fish, flatwise and in a direction transversely to their length, to a registry point such as a beheading point, with relation to which the pectoral girdle of the fish must be exactly located, comprising two blunt-edged rails disposed one above the other, and yieldingly urged relatively toward each other, said rails each extending generally in the direction of advance, but each being similarly inclined towards a terminus which bears a definite position relationship to the registry point from an initial point which is nearer the tail end of the fish, said rails being formed and positioned in the fishes' path to depress the flesh and to engage the rear edge of the pectoral girdle, at opposite sides of the fish, and by such engagement, as the fish advances, to shift the fish lengthwise if it is too far withdrawn towards its tail end, and to position the fish lengthwise, as it leaves the rails' termini, with its pectoral girdle in predetermined alignment with the registry point, the lower rail having a section, extending in advance of its own inclined section, and in advance of the upper rail, for preliminary engagement with the lower side of the fish.

5. A feeder table for a fish-dressing machine comprising means to support and means to positively advance each fish bodily transversely of its length, to a registry point, and means disposed for engagement with the rear edge of the fish's pectoral girdle, as the fish advances, and operable during such advance, if the fish is too far withdrawn towards its tail end, to shift the fish bodily in the direction of its snout and to leave the fish in position, prior to its reaching the registry point, for exact registration with such registry point.

6. A feeder table for fish-beheading machines, comprising means to advance along the table toward a beheading station fish lying crosswise of the table, and means to locate the fish lengthwise relative to the beheading station, including a member projecting into the path of advance of each fish and engageable with the pectoral girdle thereof, and operable by such engagement automatically to shift the fish positively and bodily lengthwise to dispose the pectoral girdle of the fish in proper registry with the beheading station.

7. A feeder table for fish-beheading machines, comprising means to advance along the table toward a beheading station fish lying crosswise of the table, a rail disposed generally parallel to the direction of advance, directed in general towards the beheading station, said rail projecting within the fish's path of advance and engageable with the tailward edge of the pectoral girdle on one side of a fish, and operable by such engagement to guide the fish into proper registry with the beheading station, and means engageable with the opposite side of the fish to maintain the first side thereof in engagement with said rail.

8. A feeder table for fish-beheading machines, comprising means to advance along the table toward a beheading station fish laid crosswise of the table, and a fish locating means including a member supported above the fish and having an edge extending transversely of the fish and positively engageable with a predetermined element on the upper side of the fish spaced tailward from its nose, operable during such engagement to shift the fish bodily lengthwise, and transversely of the table, relative to such beheading station by applying to such element pressure directed lengthwise of the fish and continued during such shifting, to effect proper registry of the fish with such beheading station.

9. A feeder table for fish-beheading machines, comprising means to advance along the table toward a beheading station fish laid crosswise of the table, and fish locating means including a member supported above the fish and engageable with the tailward edge of the pectoral girdle on the upper side of the fish, operable to shift the fish bodily toward its head end to effect proper registry of the fish with the beheading station.

10. A feeder table for a fish-beheading machine, comprising means to locate the fish lengthwise in proper position relative to a beheading station, including an elongated guide member having a narrow edge projecting into the path of advance of each fish and operable to depress the flesh of the fish engaged thereby, and means to effect movement of said fish transversely of its length to engage said member automatically with an edge of the pectoral girdle, said member being operable thereafter to shift the fish bodily lengthwise to dispose it in proper relationship to the beheading station.

11. A feeder table for fish-dressing machines comprising means to support and advance individual fish flatwise and disposed crosswise of the direction of advance, to a beheading point, for beheading in the vicinity of the pectoral girdle, a rail disposed lengthwise of the direction of advance, with its end which is remote from the beheading point and therefore first-engaged by the advancing fish located nearer the tail end of the fish than the end which is adjacent the beheading point and therefore last-engaged by such fish, and with such latter end located in a line just behind the beheading point, said rail projecting towards the fish, and being shaped as a narrow ridge operable to depress the flesh alongside and thereby to engage the tailward edge of the fish's pectoral girdle, and to shift the fish, solely by such engagement and by its aforesaid inclination, towards its head end, the position of the last-engaged end of the rail leaving the fish shifted to the extent necessary to locate its pectoral girdle in proper alignment with the beheading point.

12. A feeder table for fish-dressing machines comprising means to advance each individual fish, while it is disposed crosswise of the direction of advance, to and past a beheading point, a narrow rail located to engage the fish and operable to depress the flesh tailward of its pectoral girdle, when the fish is disposed somewhat towards its tail end from a position of exact registry between its pectoral girdle and the beheading point, said rail extending generally parallel to the direction of advance, but having a terminal section which is inclined, in the direction of advance, from the tail end towards the head end, to leave its terminal point, and hence the fish engaged thereby, in precise registry with the beheading point, and to shift the fish towards its snout end, if the latter was initially too far towards its tail end, by engagement of said inclined terminal section with the tailward edge of the pectoral girdle of the fish as it is advanced by said first means.

13. A feeder table for fish-beheading machines, comprising means to advance along the table toward the beheading station fish laid crosswise of the table, and guide means including an elongated guide member mounted upon and projecting upward from the table to form a narrow ridge extending generally in the direction of advance of the fish and engageable with the tailward edge of the pectoral girdle on the under side of each fish to dispose the fish in proper relationship lengthwise relative to the beheading station.

14. A feeder table for fish-beheading machines, comprising means to advance along the table toward the beheading station fish laid crosswise of the table, guide means including an elongated guide member mounted upon and projecting upward from the table to form a narrow ridge extending generally in the direction of advance of the fish and engageable with the tailward edge of the pectoral girdle on the under side of each fish to dispose the fish in proper relationship lengthwise relative to the beheading station, and means engageable with the upper side of the fish to exert yielding pressure thereon for pressing the fish against such rail.

15. A feed table for fish-beheading machines, comprising means to advance along the feed table toward a beheading station fish lying crosswise of the table, and guide means including a guide rail disposed transversely of the length of the fish and inclined slightly relative to the direction of advance of the fish, said guide rail having a free edge projecting upwardly from the feed table toward the fish and forming a narrow ridge operable to press the flesh of the fish inward for engagement with its pectoral girdle, to move the fish bodily lengthwise as it is moved along the feed table toward the beheading station by said advancing means.

16. A feed table for fish-beheading machines, comprising means to advance along the feed table toward a beheading station fish lying crosswise of the table, and guide means including a guide rail disposed transversely of the length of the fish and inclined slightly toward the beheading station in the direction of advance of the fish, said guide rail having a free edge projecting upwardly from the feed table toward the fish and forming a narrow ridge operable to press the flesh of the fish inward for engagement with the tailward edge of its pectoral girdle, to move the fish bodily lengthwise toward its head as it is moved along the feed table toward the beheading station by said advancing means.

17. A feeder table for fish-dressing machines comprising means to advance the fish flatwise and disposed crosswise of the direction of advance to and past a registry point, a rail disposed generally parallel to the direction of advance, upstanding from the table in a position and so shaped as to engage the rear edge of the pectoral girdle on the lower side of the fish, said rail terminating short of such registry point, in the direction of advance, and being so shaped and so located in relation to the registry point transversely of the direction of advance, as to shift any fish which is withdrawn too far towards its tail, by such engagement with the pectoral girdle, towards its head end into correct registry with such point, and means engageable with the upper side of the fish to maintain the lower side thereof in engagement with said rail.

18. In combination with means to advance individual fish, flatwise and in a direction transversely to their length, to a registry point such as a beheading point, with relation to which a part of the fish, intermediate its head and tail, must be exactly located, comprising a blunt-edged rail extending generally in the direction of advance, but inclined towards a terminus which bears a definite position relationship to the registry point from an initial point which is nearer the tail end of the fish, said rail upstanding in the fish's path in position to depress the flesh and thus to engage the rear edge of the pectoral girdle, as the fish advances, and by such engagement to shift the fish lengthwise towards its head, if it is too far withdrawn towards its tail, and to position the fish lengthwide, as it leaves the rail's terminus, in the predetermined exact relationship to the registry point, and means engageable with the upper side of the fish to maintain the lower side thereof in engagement with said rail.

19. A feeder table for fish-beheading machines, comprising means to advance along the table toward a beheading station fish laid crosswise of the table, and means to locate the fish lengthwise in proper position relative to the beheading station including a member above the table engageable with the fish to shift it positively lengthwise relative to the beheading station to effect proper registry therewith, a rod secured to and extending upward from said fish engaging member, and guide means embracing said rod and guiding the same for vertical movement to vary the height of said fish engaging member for engagement with fish of different size.

20. A feeder table for fish-beheading machines, comprising means to advance successively along the table toward a beheading station fish laid crosswise of the table in spaced relationship, and means to locate the fish lengthwise in proper position relative to the beheading station including an elongated member supported above the table and engageable with the fish to shift it positively lengthwise relative to the beheading station to effect proper registry therewith, said member extending lengthwise generally in the direction of advance of the fish toward the beheading station and being of a length in such direction less than the spacing of successive fish, for engagement with one fish at a time, and means guiding said fish engaging member for substantially vertical movement for corresponding engagement with fish of different size.

21. A feeder table for fish-beheading machines, comprising means to advance along the table toward a beheading point fish laid crosswise of the table, and fish locating means including a rail above the feed table and engageable with the pectoral girdle of a fish moved therealong by said advancing means, and means adjustable to vary the inclination of said rail relative to the direction of advance of the fish to vary the registry of said fish lengthwise relative to the beheading station.

22. A feeder table for fish-beheading machines, comprising means to advance along the table toward a beheading point fish laid crosswise of the table, and fish locating means including a rail above the feed table and engageable with the pectoral girdle of a fish moved therealong by said advancing means, and means supporting said rail for movement yieldingly toward the fish to depress the flesh of the fish immediately alongside the pectoral girdle during engagement therewith.

23. A feeder table for fish-beheading machines, comprising means to advance along the table toward a beheading point fish laid crosswise of the table, and fish locating means including a rail above the feed table and engageable with the tailward side of the pectoral girdle of a fish moved therealong by said advancing means, means adjustable to vary the inclination of said rail relative to the direction of advance of the fish to vary the registry of said fish lengthwise relative to the beheading station, and means supporting said rail for endwise rocking during engagement of the fish therewith and urging said rail yieldingly toward the fish to depress the flesh of the fish immediately behind the pectoral girdle during engagement therewith.

24. A device for feeding and aligning fish transversely of the plane of cutting of a header knife comprising a fish supporting table operatively positioned with respect to a fish header knife; fish conveying means operatively carried by said table to advance a fish sidewise in a direction longitudinally of the table; and fish engaging aligning plate means engageable with the bone-like structure of the part forming the gill opening of the fish from behind and moving the fish longitudinally of the fish, whereby is engaged and aligned said bone-like structure which is directly adjacent the meat portion of fish.

25. A device for feeding and aligning fish transversely of the plane of cutting of a header knife comprising a fish supporting table operatively positioned with respect to a fish header knife; fish conveying means operatively carried by said table to advance fish sidewise in a direction longitudinally of the table; and fish engaging aligning means relatively resiliently mounted as respects a fish on said table and projecting toward said fish and relatively movable lengthwise toward the head of a fish in local skin depressing contact with the fish, said relative movement lengthwise of the fish being over a meat portion until a predetermined non-meat portion is engaged and then for a travel after said non-meat portion is engaged until the fish is aligned with said header knife, whereby the fish may be moved to and aligned as respects a header knife.

26. The method of feeding and aligning varying sized fish on a fish feeding table and transversely of the plane of cutting of a header knife comprising disposing the fish substantially at right angles to the plane of cutting of the header knife; mechanically causing the fish to advance sidewise in a direction longitudinal of the table; and mechanically moving the fish transversely of the table simultaneous with the advance movement into desired aligned relation with the plane of cutting of the header knife by automatically applying a force to the bone structure of the part forming the gill opening, whereby is engaged and aligned an engageable portion directly adjacent the meat portion of fish.

27. The method of feeding and aligning varying sized fish on a fish feeding table and transversely of the plane of cutting of a header knife comprising disposing the fish substantially at right angles to the plane of cutting of the header knife; mechanically causing the fish to advance sidewise in a direction longitudinal of the table; mechanically skin depressingly contacting the fish at the bone structure forming the gill opening; and moving the so engaged fish transversely of the table into desired aligned relation with the plane of cutting of the header knife, whereby is engaged and aligned an engageable portion directly adjacent the meat portion of fish.

28. The method of feeding and aligning varying sized fish on a fish feeding table and transversely of the plane of cutting of a header knife comprising disposing the fish substantially at right angles to the plane of cutting of the header knife; mechanically causing the fish to advance sidewise in a direction longitudinal of the table; mechanically moving the fish transversely of the table simultaneous with the advance movement into desired aligned relation with the plane of cutting of the header knife by automatically applying a force to the bone structure of the part forming the gill opening, and terminating instantaneously said engaging of the fish when said fish is so aligned, whereby is engaged and aligned an engageable portion directly adjacent the meat portion of fish without such alignment being disturbed upon terminating the engagement.

29. The method of feeding and aligning varying sized fish on a fish feeding table and transversely of the plane of cutting of a header knife comprising disposing the fish substantially at right angles to the plane of cutting of the header knife; yieldingly holding the fish; mechanically causing the fish to advance sidewise in a direction longitudinal of the table while yieldingly held; and mechanically moving the fish transversely of the table into desired aligned relation with the plane of cutting of the header knife simultaneously with the advance movement by engaging the bone structure forming the gill opening, whereby is engaged and aligned an engageable portion directly adjacent the meat portion of fish.

30. The method of feeding and aligning varying sized fish on a fish feeding table and transversely of the plane of cutting of a header knife comprising disposing the fish substantially at right angles to the plane of cutting of the header knife; mechanically causing the fish to advance sidewise in a direction longitudinal of the table; and mechanically moving the fish transversely of the table simultaneous with the advance movement into desired aligned relation with the plane of cutting of the header knife by automatically applying a force to the bone structure of the part forming the gill opening, and holding down the rearwardly directed portion of an opercle, whereby is engaged and aligned an engageable portion directly adjacent the meat portion of fish.

ALVIN L. ERICKSON.

REFERENCES CITED

The following references are of record in the file of this patent:

UNITED STATES PATENTS

| Number | Name | Date |
|---|---|---|
| 1,077,577 | Zimmerman et al. | Nov. 4, 1913 |
| 1,083,693 | Morral | Jan. 6, 1914 |
| 1,403,269 | Severance | Jan. 10, 1922 |
| 1,642,444 | Hovden | Sept. 13, 1927 |
| 1,643,504 | Lea | Sept. 27, 1927 |
| 1,909,643 | Waugh | May 16, 1933 |
| 2,208,644 | Rue | July 23, 1940 |
| 2,245,330 | Danielsson | June 10, 1941 |